United States Patent Office 3,019,147
Patented Jan. 30, 1962

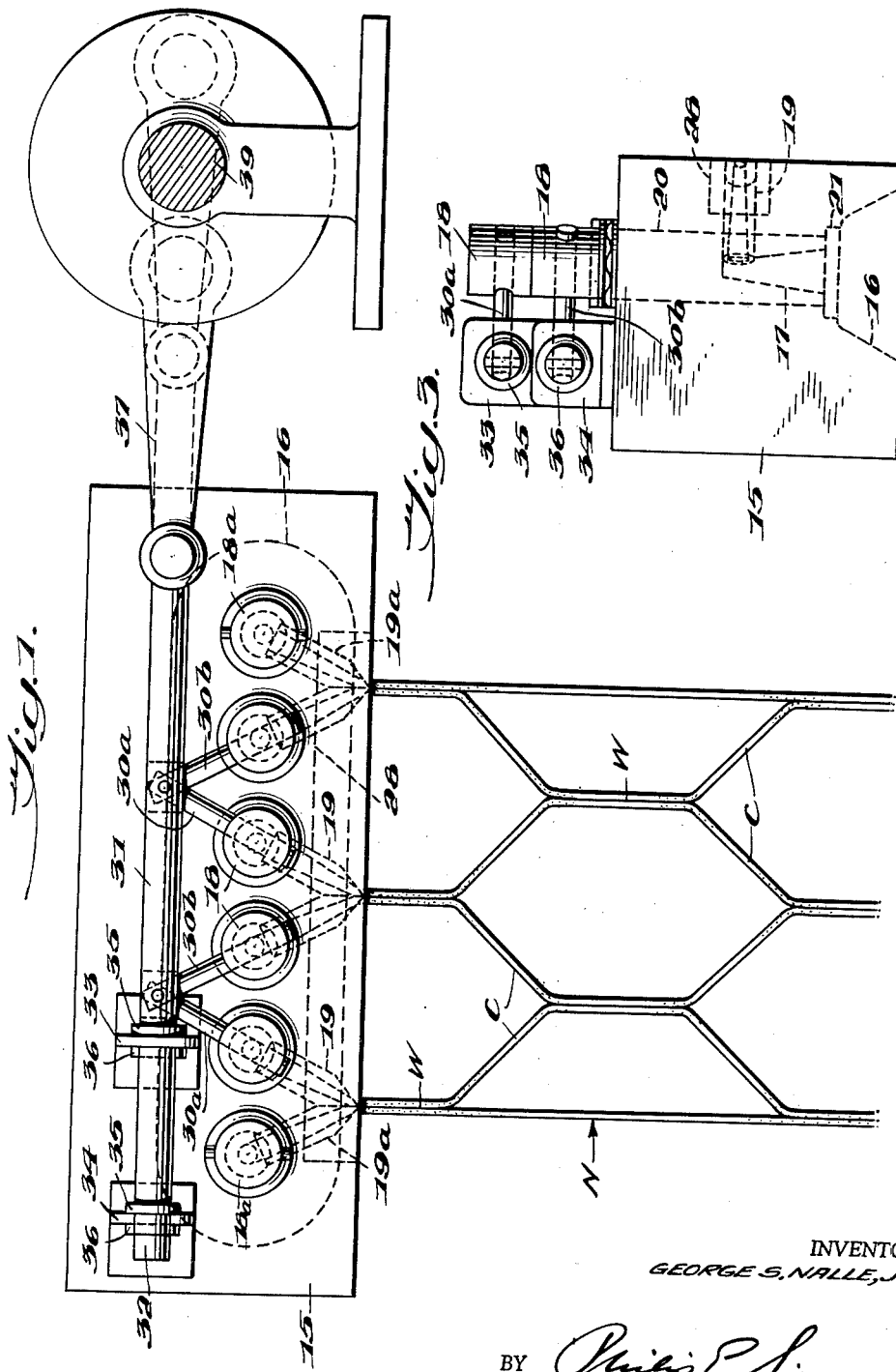

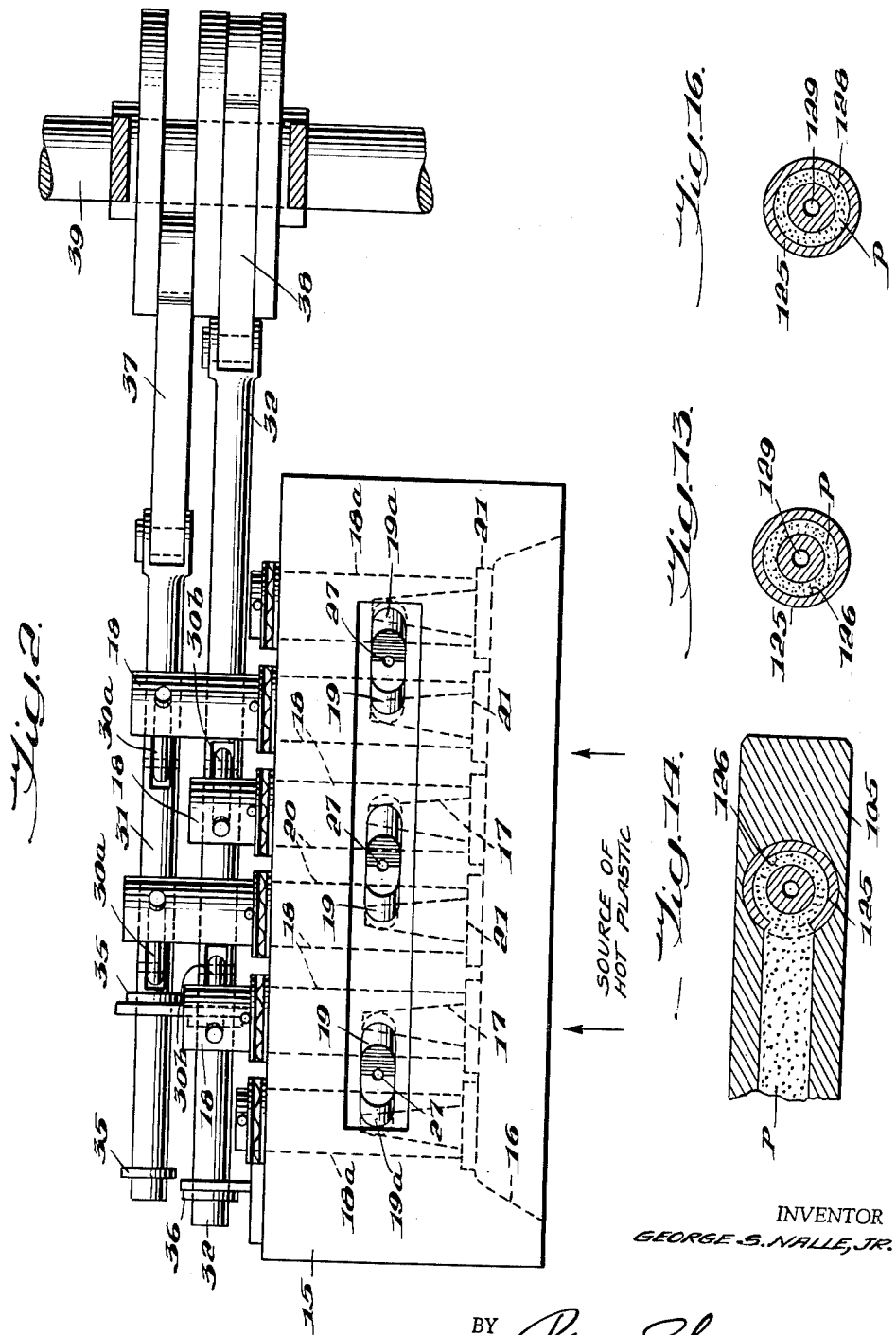

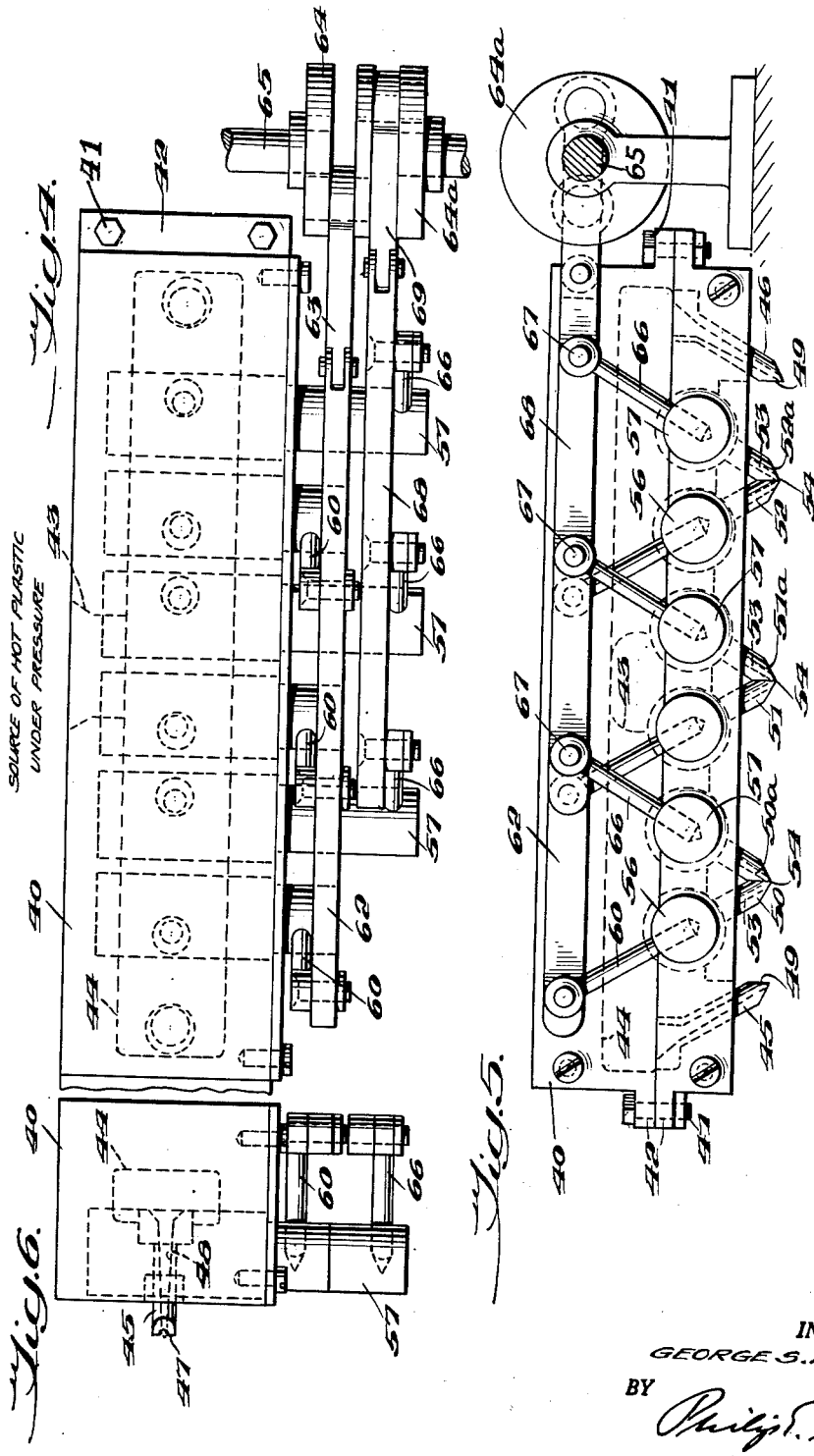

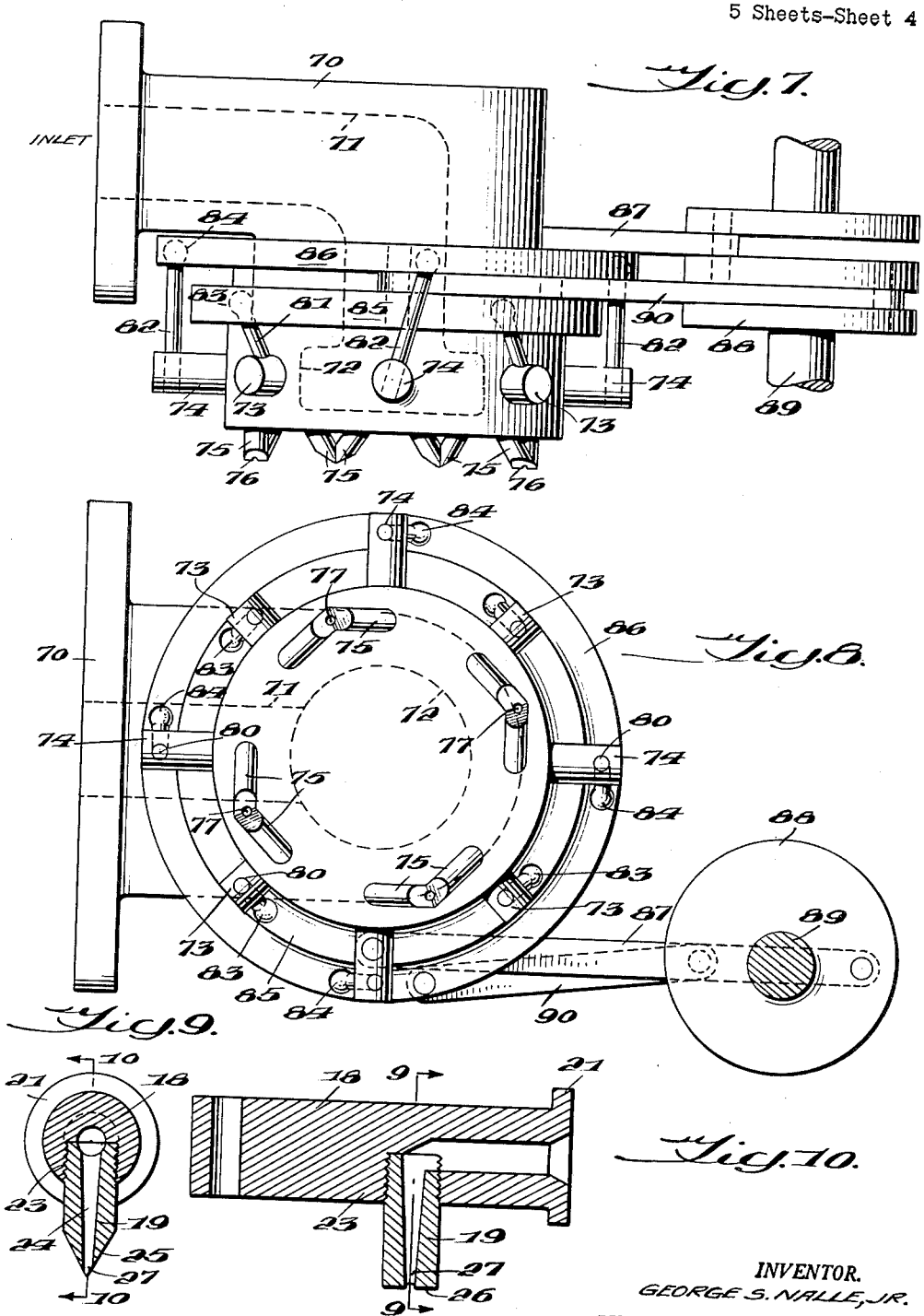

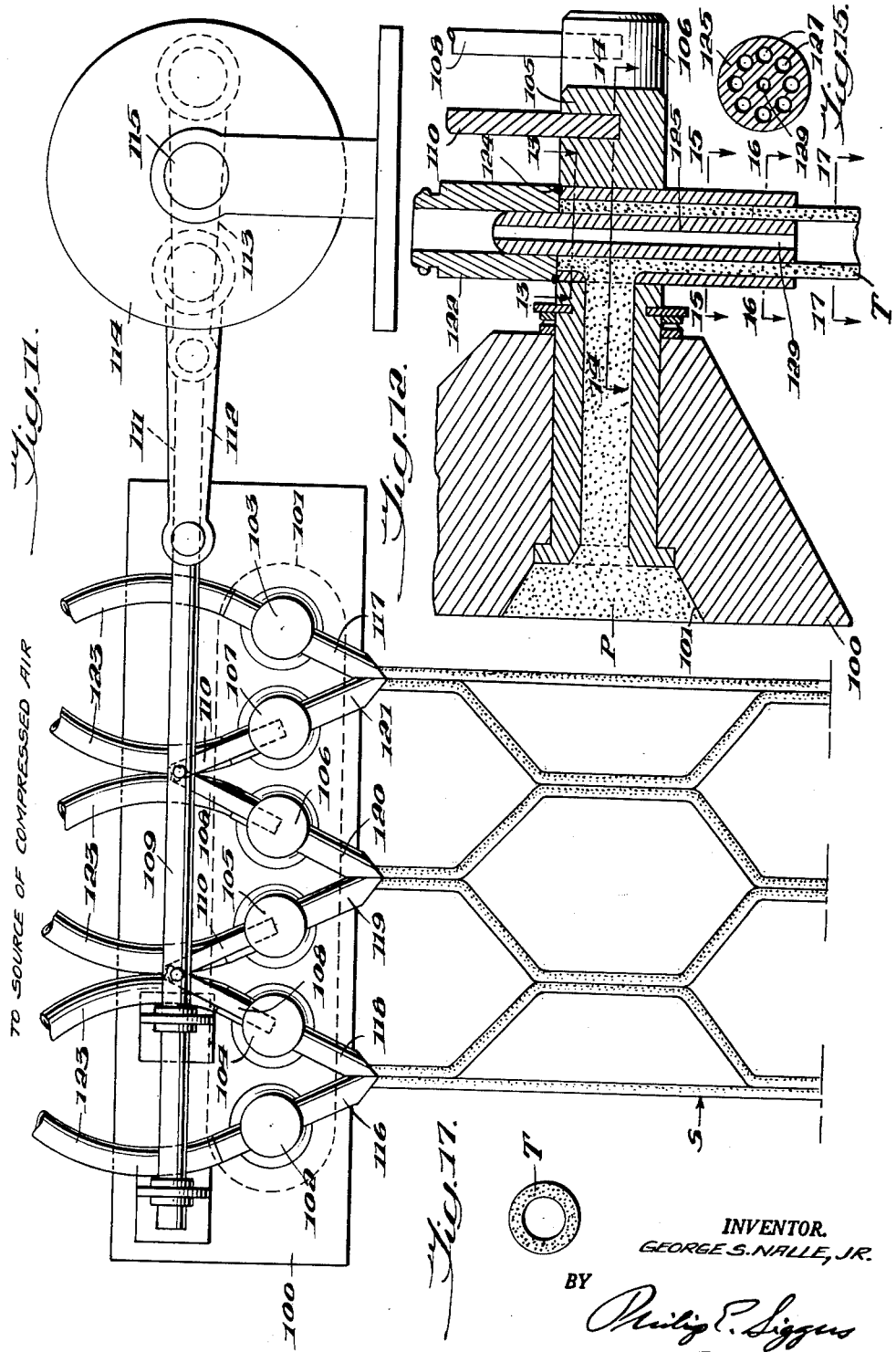

3,019,147
PLASTIC NETTING EXTRUSION APPARATUS WITH OSCILLATING CONTACTING DIE ELEMENTS AND PRODUCTS OF SUCH APPARATUS
George S. Nalle, Jr., 108 W. 2nd St., Austin, Tex.
Filed May 9, 1960, Ser. No. 27,662
15 Claims. (Cl. 154—46)

This invention relates to plastic netting extrusion apparatus and to products of such apparatus. The term "plastic" includes plastic extrudable metals and metal alloys as well as resinous plastics. The term "netting" includes not only meshed fabrics made from filaments or strands, but also meshed structures composed of small plastic tubes.

The general object of the invention is to provide a machine which will extrude in a single continuous operation a plastic netting or meshed structure which is finished except for hardening, and cutting to size. A further object is to provide a machine of the character indicated which may extrude either a continuous flat netting or, with a rearrangement of parts, a continuous netting in tubular form. Another object is to provide a method and means for extruding plastic tubes and simultaneously forming a netting or meshed structure made of said tubes. Such a structure would form a springy padding under rugs and carpets, and may have many other domestic and industrial uses.

Other objects will be apparent from the following description of several embodiments of the invention shown in the accompanying drawings forming a part of this specification.

In said drawings—

FIG. 1 is a somewhat diagrammatic side elevation of one embodiment of the invention, a fragment of the product, a plastic netting, being shown as it is extruded;

FIG. 2 is a bottom plan view of the apparatus shown in FIG. 1, omitting the netting;

FIG. 3 is an end elevation of the apparatus of FIG. 2;

FIG. 4 is a top plan view of a slightly different form of extrusion apparatus, also shown somewhat diagrammatically;

FIG. 5 is a side elevation of the machine of FIG. 4;

FIG. 6 is an end elevation of the machine of FIG. 4;

FIG. 7 is a side elevation of a circular form of extrusion apparatus embodying the principles of the invention but adapted to form a continuous tubular netting;

FIG. 8 is a bottom plan view of the apparatus of FIG. 7;

FIG. 9 is a detail in section, being a section on line 9—9 of FIG. 10, showing one of the extrusion nozzles and its mounting;

FIG. 10 is a detail in section, being a section on line 10—10 of FIG. 9, showing an extrusion nozzle and its mounting;

FIG. 11 is an elevation of a machine like that of FIG. 1, but modified so as to form a plastic meshed structure whose strands are small plastic tubes, the plastic meshed structure being shown in its simplest form for convenience of illustration;

FIG. 12 is an enlarged vertical section through one of the extrusion nozzles of FIG. 11, showing the plastic being formed into a tube;

FIGS. 13, 14, 15 and 16 are detail sectional views respectively on lines 13—13, 14—14, 15—15 and 16—16 of FIG. 12; and FIG. 17 is a section on line 17—17 of FIG. 12, being an enlarged section through one of the tubes that makes up the plastic meshed structure of FIG. 11.

Referring particularly to FIGS. 1, 2 and 3 of the drawings, 15 designates a die head, preferably of massive metal to withstand the pressure of the plastic material, having an inlet 16 connected to a pressurized supply of hot plastic material, not shown. The die head 15 may be heated by electric resistance wires or by other means, not shown, to maintain the fluidity of the plastic material until it has been extruded. The plastic material flows into frusto-conical ducts 17, each of which extends axially of an oscillating pin 18. In the drawings only four oscillating pins 18 are shown; in an actual machine there may be ten times as many, or even more. Each oscillating pin 18 serves both as a conduit for the plastic and as an essential support for a die element or nozzle 19 from which the plastic is extruded. The oscillating pins 18 may be of brass and have a rotating fit in bores 20 provided in the steel die head 15, and preferably each pin 18 has a flange 21 at one end fitting in a counterbore in the die head. These flanges obviate axial movement of the pins in bores 20 responsive to the highly pressurized plastic. At each end of the battery or set of pins 18 are fixed pins 18a which are similar to pins 18.

About midway of the length of the pins 18 the frusto-conical ducts 17 discharge the plastic material into the ends of hollow die elements or nozzles 19. (FIGS. 9 and 10 show a similar element.) Nozzles 19 are preferably secured in tapped bores 23 by screw threads, have extrusion passages 24 and have doubly beveled ends 25 meeting in knife edges 26. The extrusion passages 24 become narrower toward the outer ends of the nozzles 19 and terminate as fine extrusion openings 27 at the center of the knife edges 26. The extrusion openings are shown larger than normal for clearness of illustration; in actual practice they may be as fine as 1 micron in diameter. The angles of the beveled surfaces at ends 25 are such that when two of the nozzles are rocked to one extreme position, as shown in FIG. 1, the opposed beveled surfaces are in full contact throughout their areas, and the two extrusion openings 27 meet to form a single opening, see FIG. 2. Nozzles 19 swing in a slot 28 formed in the die head on the discharge side. Nozzles 19a at each end of the set do not swing.

Each of the pins 18 is oscillated through an arc by means of an arm 30a or 30b transversely fixed to the pin and forming an operating lever. In the drawings, arms 30a are pivotally connected at their free ends to a reciprocating rod 31, while arms 30b are pivotally connected to a reciprocating rod 32. Rods 31, 32 slide in bearings 33, 34 (shown diagrammatically) and carry pairs of stops 35, 36 to limit their travel. Rods 31, 32 are pivotally connected to cranks 37, 38 respectively, which are both driven by a power-actuated shaft 39, the two cranks 37, 38 being 180° out of phase so that when one reciprocating rod 31 reaches one extreme position, the other reciprocating rod 32 will be at the other extreme position. In lieu of the crank mechanism shown, a cam mechanism may be employed, or any other mechanism which will actuate the reciprocating rods in the proper sequence. The nozzles 19 thus are oscillated back and forth, first into contact with the adjacent nozzle on one side, then into contact with the adjacent nozzle on the other side, and all the while the pressurized plastic material flows out through the extrusion apertures 27.

FIG. 1 illustrates a fragment of the flat netting N that will be formed by the described apparatus. The two strands of plastic material that issue from the juxtaposed apertures 27 are welded or fused together as indicated at W. The lengths of these fused or welded portions (which are of nearly double the thickness of a single strand) are governed by the dwell or pause at the end of each swing of the nozzles 19. The connecting strands C which link together the welds W are of single thickness as each strand C is formed by a single nozzle 19 while it is oscillating from one extreme position to the other. The angles of the strands C may be varied by changing the speed of reciprocation of rods 31, 32, hence the speed of movement of nozzles 19. The diameter or fineness of the strands may be varied by substituting other nozzles with different extrusion openings. The netting N is discharged into a tank of ice water (not shown) directly below the die head, and in the tank the netting may be picked up by a crowned roller (not shown) to keep it from narrowing as it is pulled through the apparatus. The general arrangement may be as illustrated in my pending application Ser. No. 837,732, filed September 2, 1959.

Now referring to FIGS. 4, 5 and 6, a slightly different form of extrusion apparatus is there shown. The die head 40 is split or formed in two parts clamped together by bolts 41 passed through flanges 42. This arrangement facilitates cleaning and other servicing operations. An inlet 43 admits the hot plastic material under pressure, and a chamber 44 inside the die head receives the material from the inlet 43 and distributes it to the nozzles to be described. At opposite ends of the chamber 44 there are nozzles 45, 46 extending outside the die head at angles which are complementary to each other, said nozzles being fixed and having doubly beveled ends forming a knife edge 47. A narrow tapering plastics passageway 48 extends axially through the nozzles 45, 46 and terminates at the center of the knife edge 47. It will be noted from FIG. 5 that the angles of the fixed nozzles 45, 46 are such that their beveled surfaces 49 (which face inwardly of the die head) lie in vertical planes.

Located between the fixed nozzles 45, 46 are six swingable or oscillatable nozzles 50, 50a, 51, 51a, 52, 52a; these swingable nozzles having narrow tapering plastics passages 53 and doubly beveled ends forming knife edges 54. The discharge ends of extrusion openings 53 are in the centers of the knife edges 54, as will be understood by comparing the similar construction shown in FIGS. 9 and 10. The angles of the beveled nozzle ends are such that when any two of the nozzles are swung into end contact, as illustrated in FIG. 5, the plane beveled surfaces of the two contacting nozzles lie flat against each other and the extermities of the extrusion openings are tangential, so that their extrusions are welded together longitudinally, as at W, FIG. 1. When the nozzles 50 and 52a are swung to engage the fixed end nozzles 45, 46 respectively, the contacting beveled faces will lie flat against each other and their extrusion openings will be tangential to form welded strands W of approximately double thickness. It will be understood that the netting fabric formed will be similar to the one partly illustrated in FIG. 1, and that there may be ten or more times as many nozzles as are illustrated in the drawings.

In the form of FIGS. 4, 5 and 6 the movable nozzles 50, 51, 52 are fixed to but are removable from the hollow pins 56 which are simultaneously oscillated in one direction about their axes, while nozzles 50a, 51a, 52a are likewise fixed to but are removable from hollow pins 57 which are simultaneously oscillated in the opposite direction about their axes. The hollow pins 56, 57 are preferably made of brass and turn in bearings provided in the die head. Each hollow pin has a transverse opening (not shown) for admission of the plastics and an axial passage conducting the plastics to the nozzle element which it carries. Thus plastics flow from the inlet 43 through chamber 44 into the hollow pins and through them to the nozzles 50–52a, also from chamber 44 through the fixed end nozzles 45, 46. This flow continues whatever the angular positions of the oscillating nozzles 50–52a.

To swing the nozzles 50, 51 and 52 simultaneously through the same arcs, each of the hollow pins has a lever arm or link 60 fixed thereto and extending outwardly to a pivotal connection with a reciprocating rod 62. A crank 63 is pivotally connected to the end of rod 62 and is actuated by a crank disk 64 fixed to a power-actuated shaft 65. In lieu of this arrangement, other mechanical drives may be used, for example a cam mechanism, not shown. To swing the nozzles 50a, 51a and 52a simultaneously through the same arcs, each of the hollow pins 57 has a lever arm or link 66 fixed thereto and extending outwardly to a pivotal connection 67 with a second reciprocating rod 68. Shaft 65 drives the reciprocating rod 68 by means of a second crank 69 which is connected to the crank disk 64a at a point 180° apart from the connection of crank 63. Thus the reciprocating rods 62, 68 move in opposite directions, and the nozzles 50, 51 and 52 contact the nozzles 50a, 51a and 52a respectively at one end of their swing (full lines in FIG. 5) then move into contact with nozzles 45, 50a, 51a respectively at the end of their swing in the opposite direction (dotted lines in FIG. 5). Nozzle 52a alternately contacts nozzle 52 and the fixed nozzle 46, as indicated. With the plastic material continuously issuing from the extrusion openings of the nozzles, the resultant flat netting is like the netting N of FIG. 1. The netting is pulled through a tank of ice water (not shown) as previously mentioned.

To make a tubular netting, that is, a netting which is a continuous tube, with apparatus employing the principles of my invention, the embodiment of FIGS. 7 and 8 has been designed. FIGS. 7 and 8 show only four pairs of nozzles, each with a relatively large extrusion opening. In an actual installation, there may be ten or more times as many nozzles, and their extrusion openings may be very fine, as fine as 1 micron.

The die head 70 has an inlet at one end, as indicated by the legend, and a passage 71 for the pressurized plastic material, said passage having a right angle bend as indicated in dotted lines, FIG. 7, and delivering the plastic to a circular chamber 72 at the lower end of the die head. The chamber 72 receives the inner open ends of eight oscillating pins, each like the pin 18 shown separately in FIGS. 9 and 10. Four of the pins 73 are arranged radially 90° apart and extend a short distance outwardly through the wall of the die head. Another set of four pins 74 are arranged radially 90° apart and each one is spaced 45° from the pins 73 on either side. Pins 74 are substantially longer than pins 73. Each oscillating pin 73, 74 carries a nozzle 75 and each nozzle 75 has a doubly beveled outer end terminating in a knife edge 76, the extrusion passage 77 of the nozzle ending in the center of said knife edge. The nozzles 75 may be screw threaded (not shown) in bores provided in the pins, but any other suitable means may be used to secure the nozzles removably in the correct position to make proper contact with the nozzles on either side, as illustrated in FIGS. 7 and 8. The pins 73, 74 necessarily have axial passages (not shown) conducting the plastic to the nozzles and may have end flanges received in counterbores (not shown) in the die head to take the thrust of the pressurized plastic. A transverse bore 80 in the outer end of each pin 73, 74 receives the levers or links 81, 82 respectively, each lever being fixed to a pin as by a press fit. The other ends of the levers or links 81, 82 are provided with ball-shaped heads 83, 84 respectively which are received in ball sockets (not shown) provided in rings 85, 86 respectively. These ball and socket connections are obviously universal joints.

Rings 85 and 86 surround the die head 70 and ring 86 is spaced above ring 85 and is larger in diameter than ring 85, so that the links 82 may rock with ring 86 without contacting ring 85. Ring 85 has a crank 87 pivotally connected to it (FIG. 8), the other end of the crank being pivotally connected to a crank disk 88 which is driven by a power-actuated shaft 89. Ring 86 has a crank 90 pivotally connected to it, and crank disk 88 operates crank 90. The cranks 87, 90 are connected to the crank disk at points 180° apart, so that as shaft 89 rotates, the rings 85, 86 are contra-oscillated, causing pins 73 to oscillate in one direction while pins 74 oscillate simultaneously in the opposite direction. This causes each of the nozzles 75 to swing into contact with the nozzle on one side of it and then to swing and contact the nozzle on the opposite side of it, these contacts always bringing together the flat beveled surfaces at the outer ends of the nozzles as FIGS. 7 and 8 show. This brings the extrusion openings of two nozzles together to make welded extrusions of approximately double thickness, as indicated at W, FIG. 1. When the juxtaposed nozzles swing apart, the strands separate and are of single thickness, as shown at C, FIG. 1.

Referring to FIGS. 11 and 12, I have shown the machine of FIG. 1 modified to extrude a plastic meshed structure S made up of a plurality of small tubes T welded to each other without crossing. The meshed structure S is illustrated in its simplest form and is entirely similar to the netting N of FIG. 1 except that its strands are hollow or tubular, one of the tubes T being shown in enlarged section in FIG. 17.

The die head 100 is connected to a source of pressurized plastic, not shown, the plastic flowing through a chamber 101 to a set of hollow pins supported in a straight row on the die head. The two end pins 102, 103 of the row are fixed while the pins 104, 105, 106, 107 intermediate the end pins are supported to oscillate on their axes. Pins 104, 106 have arms 108 fixed to them to extend radially outwardly. The outer ends of arms 108 are pivotally connected to a reciprocating rod 109. Pins 105, 107 have arms 110 fixed thereto at one end, while the outer ends of arms 110 are pivotally connected to a reciprocating rod 111. The reciprocating rods 109, 111 slide in bearings (shown diagrammatically) fixed to the die head, and cranks 112, 113 respectively are connected to crank disks (only one, designated 114, being shown), carried by the power-driven shaft 115. The crank connections are 180° out of phase, as FIG. 11 indicates, so that as rod 109 moves to the left, rod 111 moves to the right, and the pins 104–107 are oscillated through arcs determined by the "throw" of the cranks. Each pin 102–107 supports a nozzle or extrusion member, the end nozzles 116, 117 being stationary, since pins 102, 103 are fixed, while the intermediate nozzles 118, 119, 120, 121 oscillate with their supporting pins. All the nozzles 116–121 have beveled ends as shown, and the angles of the beveled surfaces are such that nozzle 118 first contacts end nozzle 116, with the beveled surfaces flat against each other, then swings into contact with nozzle 119; the nozzle 119, after the contact just mentioned, swings to contact nozzle 120, and so on. The nozzles 116–121 each have nipples 122 for coupling flexible air hoses 123, all the air hoses being connected to a source of compressed air, not shown, said source supplying air at a carefully regulated pressure to the interiors of the plastic tubes T as they are formed.

Referring to FIGS. 12–16 inclusive, nipples 122 are secured as by silver solder (indicated at 124) to the upper ends of spiders or spreaders 125. Each spider 125 receives plastic material P at its upper end, where it has an annular chamber 126 (FIGS. 13 and 14). Below this annular chamber 126 the spider has a plurality of fine straight parallel pasages 127, shown in FIG. 15, and these passages 127 discharge the plastic into another annular chamber 128 shown in FIG. 16. Air from the compressed air supply is led through bores 129 to the point where the tube T is formed and extruded. The diameter of the tube T may be controlled to some extent by the air pressure at the extrusion point. The formation of the meshed structure S, FIGURE 11, will be obvious from the foregoing description.

By following the principle of the machine of FIGS. 7 and 8, a tubular meshed fabric may be continuously formed from the tubular strands T united as shown in FIG. 11.

The several plastic meshed structures formed by my machines would be useful in reinforcing textiles and may form nettings usable where many types of textile nets are now used. The process of my invention is characterized by a high production rate, as the nettings do not need to be further worked.

While I have described the several forms of machines in considerable detail, I do not wish to be limited to such details as the invention may be embodied in other forms neither described nor shown.

Having described the invention, what I claim as new and desire to secure by Letters Patent is:

1. Apparatus for extruding a netting of plastic material comprising, in combination, a source of pressurized plastic material; a hollow die head connected to said source to receive said plastic material; a plurality of nozzles, at least some of which are swingably mounted on the die head and all of which are adapted to receive the plastic material from the interior of said die head, all of said nozzles being adapted to discharge the plastic material from their discharge ends outside the die head as continuous extruded running lengths; pairs of said nozzles being constructed and arranged to contact each other at their outer discharge ends at one end of the arc of swing and during such contact to weld two adjacent plastic lengths together as said plastic lengths are extruded from contacting nozzles; and power means to swing said swingably mounted nozzles back and forth according to a predetermined time sequence.

2. The invention defined in claim 1, wherein the nozzles are arranged in a straight row, and the two nozzles at the opposite ends of the row are fixed and are intermittently contacted by the respectively adjacent nozzles as they swing, all the other nozzles in the row being swingable through arcs.

3. The invention defined in claim 1, wherein the nozzles are arranged in a circular series with their discharge openings in the same general plane, and all the nozzles are swingable, every other nozzle being swingable in one direction, the remainder of the nozzles being simultaneously swingable in the other direction, and all the nozzles then simultaneously reversing their previous respective swings.

4. Apparatus for extruding a netting of plastic material comprising, in combination, a die head adapted to be connected to a source of pressurized plastic material and being hollow on the inside; a plurality of hollow pins mounted on said die head and being oscillatable about their own axes, said pins receiving the pressurized plastic from the interior of said die head; a nozzle element fixed to each hollow pin and receiving pressurized plastic therefrom and discharging it through an opening as a filament or strand; the nozzle elements being so positioned that adjacent nozzle elements contact each other at their discharge openings as the pins are oscillated; the contacting surfaces of adjacent nozzle elements lying momentarily flat against each other and the openings of adjacent contacting nozzle elements being brought so close together as to form substantially one opening, at the end of each swing of the pins; and mechanism to oscillate the pins simultaneously back and forth.

5. The invention defined in claim 4, wherein the nozzles and pins are arranged in a straight row, and the two nozzles and pins at the opposite ends of the row are fixed, all the other nozzles in the row being swingable in pairs which alternately are in contact, then separate to contact other nozzles on either side.

6. The invention defined in claim 4, wherein the pins and their nozzles are arranged in a circular series with the discharge openings in the same general plane, and all the nozzles are swingable, every other nozzle being swingable in one direction, the remainder of the nozzles being simultaneously swingable in the opposite direction, and all the nozzles then simultaneously reversing their previous respective swings.

7. Apparatus for extruding a netting of plastic material comprising, in combination, a die head adapted to be connected to a source of pressurized plastic material and being hollow on the inside; a plurality of hollow pins journaled in the die head with their axes in the same plane; said hollow pins receiving the plastic from the inside of the die head; a nozzle element fixed to each hollow pin and having an extrusion opening at its outer end; all the hollow pins and nozzle elements being arranged in a straight row; levers fixed to the hollow pins outside the die head; a reciprocating rod pivotally connected through certain ones of said levers to alternate hollow pins to cause said pins to oscillate together; a second reciprocating rod pivotally connected through others of said levers to the other hollow pins to cause the other hollow pins to oscillate together; power-operated mechanism connected to both said reciprocating rods, with the rod connections 180° out of phase, so that the two rods move simultaneously in opposite directions to cause each nozzle element to swing first toward the nozzle element on one side, then toward the nozzle element on the other side; each nozzle element being so supported and so shaped at its extrusion end that it may alternately contact the nozzle elements on both sides as it swings; the extrusion openings of contacting nozzle elements being adjacent so that the extrusions of contacting nozzle elements are welded together longitudinally without crossing.

8. The invention defined in claim 7, wherein there are two hollow pins that are fixed to the die head, nozzle elements being fixed to and projecting from said two fixed hollow pins and being at the opposite ends of said row; the swingable nozzle elements that are adjacent said fixed nozzle elements alternately contacting said fixed nozzle elements and the swinging nozzle elements on their opposite sides.

9. The invention defined in claim 7, wherein there are two nozzle elements rigidly secured to hollow pins fixed at the opposite ends of said row, said fixed pins and the nozzle elements secured thereto receiving the plastic material directly from the interior of the die head; the swingable nozzle elements that are adjacent said fixed nozzle elements alternately contacting said fixed nozzle elements and the swinging nozzle elements on their opposite sides.

10. Apparatus for extruding a netting of plastic material comprising, in combination, a die head adapted to be connected to a source of pressurized plastic material and being hollow on the inside; the die head having a circular lower portion; a plurality of hollow pins journaled in said circular lower portion and extending radially outwardly of the die head, the inner ends of said hollow pins receiving the plastic material; alternate ones of the hollow pins being longer than the other pins; arms each fixed at one end to the longer hollow pins; a power-oscillated ring having universal joint connections with the other ends of the arms so as to oscillate said longer pins simultaneously; other arms each fixed at one end to the shorter hollow pins; a second power-oscillated ring having universal joint connections with the other ends of said other arms so as to oscillate said shorter pins simultaneously; power-driven mechanism connected with said rings so as to oscillate them simultaneously but 180° out of phase; and nozzle elements fixed to and projecting from each of said hollow pins and receiving plastic material therefrom, said nozzle elements having extrusion openings and being constructed and arranged to contact each other, adjacent nozzle elements alternately contacting each other and the nozzle elements on either side, the extrusion openings of contacting nozzle elements being so close together that the extrusions of contacting nozzle elements are welded together longitudinally without crossing.

11. Apparatus for extruding a netting of plastic tubular strands comprising, in combination, a source of pressurized plastic material; a hollow die head connected to said source to receive said plastic material; a plurality of nozzles at least some of which are swingably mounted on the die head and all of which are adapted to receive the plastic material from the interior of said die head, all of said nozzles being adapted to discharge the plastic material outside the die head as continuous tubes; pairs of said nozzles being constructed and arranged to contact each other as they are swung and to weld two adjacent plastic tubes together as they are extruded from contacting nozzles; and power means to swing said nozzles back and forth according to a predetermined time sequence.

12. The invention defined in claim 11, wherein means are provided to supply air under pressure to the interiors of the nozzles to enter the plastic tubes at the points where they are formed, to keep the plastic tubes from collapsing.

13. As an article of manufacture, a continuous meshed structure made up of a plurality of tubes of extrudable plastic material, adjacent tubes being in contact and welded together without crossing for a certain fraction of their length and then separating, and then being again brought into contact and welded together, and so on; the welded portions being of a width nearly double the diameter of the tubes, and the separated portions being single tubes.

14. A machine for automatically extruding a plastic meshed structure made of integrally joined strands each of which is a plastic tube, comprising, in combination, a die head connected to a source of pressurized plastic material; a set of extrusion nozzles mounted adjacent each other on the die head, each of said extrusion nozzles being constructed and arranged to receive the plastic material at its inner end and to discharge the plastic material at its outer end as a small plastic tube; certain ones of said nozzles being mounted to oscillate so that each oscillating nozzle contacts at its outer end either of the two closest adjacent nozzles; means to conduct compressed air to the point of discharge of the plastic material from each of the nozzles and on the interior thereof so as to supply fluid pressure internally to the plastic tube; and power means to oscillate said oscillatable nozzles, every other nozzle swinging in one direction, the remaining nozzles simultaneously swinging in the other direction, and all said nozzles then reversing their previous swing, to cause the plastic tubes as they are extruded to weld together without crossing, and then to cause the plastic tubes to separate, and then to cause the plastic tubes to weld together without crossing, and so on.

15. The invention defined in claim 14, wherein the set of extrusion nozzles are arranged in a straight row with the ends of the nozzles in the same plane, the two nozzles at the opposite ends of said row being fixed, all the other nozzles being oscillatable; the extruded plastic material forming a flat meshed structure with straight tubes at its opposite edges, said straight tubes being extruded by said fixed nozzles at the ends of said straight row.

References Cited in the file of this patent

UNITED STATES PATENTS

| 2,502,514 | Ewer | Apr. 4, 1950 |
| 2,919,467 | Mercer | Jan. 5, 1960 |

FOREIGN PATENTS

| 182,336 | Japan | Mar. 16, 1950 |
| 4,139 | Japan | Nov. 30, 1950 |
| | (Addition to 182,336) | |
| 552,251 | Belgium | Nov. 14, 1956 |

Notice of Adverse Decision in Interference

In Interference No. 92,931 involving Patent No. 3,019,147, G. S. Nalle, Jr., PLASTIC NETTING EXTRUSION APPARATUS WITH OSCILLATING CONTACTING DIE ELEMENTS AND PRODUCTS OF SUCH APPARATUS, final judgment adverse to the patentee was rendered Sept. 25, 1964, as claims 1, 2 and 3.

[*Official Gazette February 23, 1965.*]